United States Patent [19]
Johnson

[11] Patent Number: 4,579,872
[45] Date of Patent: Apr. 1, 1986

[54] UNIFORM MINIMIZATION OF PLASTIC FOAM CELL SIZE

[75] Inventor: David R. Johnson, Midland, Mich.
[73] Assignee: The Dow Chemical Company, Midland, Mich.
[21] Appl. No.: 730,536
[22] Filed: May 6, 1985
[51] Int. Cl.[4] .............................. C08J 9/16; C08J 9/18
[52] U.S. Cl. ....................................... 521/60; 521/56; 521/58; 521/59; 521/139; 521/910
[58] Field of Search ....................... 521/56, 58, 60, 918

[56] References Cited
U.S. PATENT DOCUMENTS
3,960,784  6/1976  Rubeus .................................. 521/60
4,226,942  10/1980  Wei ........................................ 521/60

Primary Examiner—Morton Foelak
Attorney, Agent, or Firm—R. B. Ingraham; M. L. Winkelman

[57] ABSTRACT

Expandable beads and the like of thermoplastic organic polymer material, advantageously lightly-crosslinked in preparation, which are imbibed with halocarbon and/or light hydrocarbon (including mixed) blowing agents are advantageously tempered to provide excellent quality, uniformly fine-celled expanded cellular products therefrom by a quick quench from imbibition temperature to below 10 or so ° C. within one minute.

9 Claims, 1 Drawing Figure

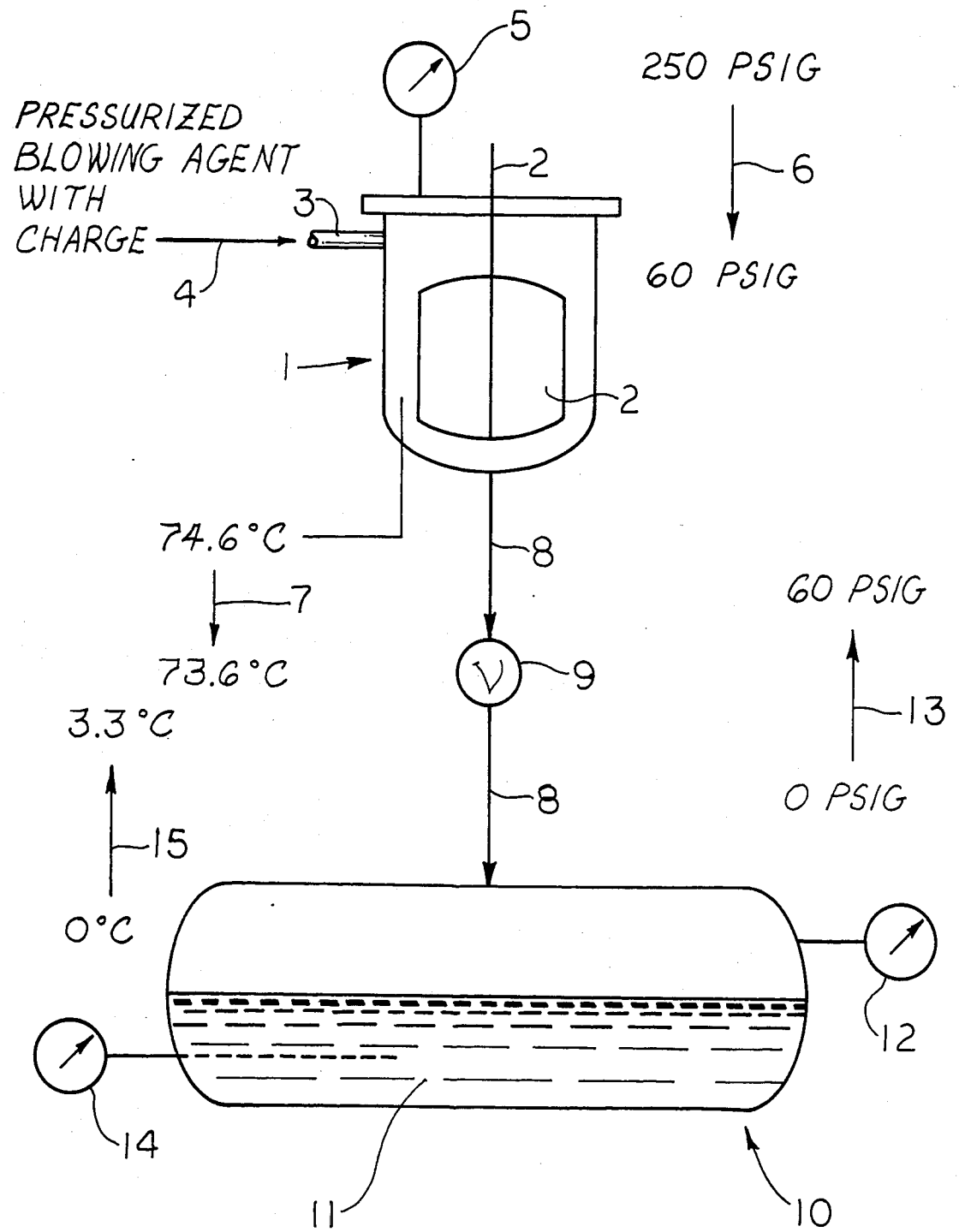

UNIFORM MINIMIZATION OF PLASTIC FOAM CELL SIZE

BACKGROUND OF THE INVENTION

Field of the Invention

This invention entails a novel technique for making extremely fine and uniformly-sized cell structures in light weight, fabricated foam products of certain gas- or vapor-incorporating expandable thermoplastic organic polymer compositions, particularly those of lightly-crosslinked styrene polymers (notably so-modified homopolystyrene) that utilize various imbibed fluorochlorocarbons, and/or hydrocarbons as blowing agents.

Closed-cell foam and the like expanded cellular bodies and products of any of a large variety of thermoplastic polymers which have fine cell structure characteristics and markedly low bulk density are well known materials which are finding ever-increasing use for insulation, packaging, constructional, decorative and many other purposes. U.S. Pat. No. 3,272,215 incorporated by reference thereto, aptly illustrates technology established to such end.

It is well known that lightly-crosslinked thermoplastic polymers will expand to low density foams when impregnated so as to contain effective, expanding quantities of normally-gaseous and/or otherwise relatively volatile blowing agents. Copolymers of styrene with minor amounts of divinylbenzene, such as those which contain on the order of about 0.04 or so percent by total molecule weight of interpolymerized divinyl benzene, are typical of such lightly-crosslinked polymer systems; this being the case when homopolystyrene is the involved polymer. Equivalents as to both involved polymer and involved crosslinking agent are likewise well known and readily available to those skilled in the art.

Fine cells have diameters in the general range of 0.02 millimeters while coarse cells are in the range of 0.18 millimeters and generally acceptable cells are in the range of 0.08 millimeters.

Relevant art representative of the state thereof is representative and brought forth by U.S. Pat. Nos.: 2,848,427; 2,848,428; 2,948,664; 2,948,665; 2,952,594; 3,098,832; 3,264,272; 3,526,652; 3,717,559; 3,878,133; 3,940,517; 3,986,991; and 4,169,921. The disclosure of each being incorporated by reference.

When expandable thermoplastic polymer masses are blown into cellular fabricated foam bodies intended to have extremely fine-sized cells that are desirably uniformly contained throughout the expanded mass, difficulties and unwanted results are frequently experienced in and as a result of the operation. When heretofore known processing techniques for incorporating blowing agent within polymer mass intended to be expandably-transformed including conventional steps associated therewith are utilized, the resultant expanded and foamed body obtained is oftentimes objectionably deficient in both physical property and appearance characteristics in that it does not have optimumly desirable uniform fine-sized cell structure(s) in the very low bulk density product(s) contemplated for preparation. This, of course, handicaps and detracts from the attractiveness and functional utility(ies) wanted for such end products.

It would be advantageous, and it is the principle aim and objective of the present invention, to provide an expedient and easily-accomplished technique for providing expandable foam product raw materials from lightly-crosslinked thermoplastic organic polymer compositions imbibed with certain blowing agent components with the capability of readily being convertible in ordinary expansion transformation operation (as by subjection to heat at an elevated "blowing temperature" with or without physical molding confinement(s)) into excellently-propertied, most attractively-appearing and uniformly fine-celled and structured, very low bulk density and markedly light weight expanded cellular or foamed plastics products.

These benefits and other advantages are achieved in accordance with the present invention; the specific manner of which the same may be accomplished is better understood from a consideration of some preferred forms of same which is hereinafter described in the following claims—all of which for purposes of instant disclosure are here repeated and incorporated by reference.

THE DRAWING

The sole FIGURE of the accompanying drawing is a view representative of a fanciful and schematically-implemented flow sheet sort of sketch illustrating one manner of embodiment of the technique pursuant to the present invention wherein and whereby uniform and maximized minimization of plastic foam cell size in resultant expanded and foamed products may be ensured by a processing step involving the intermediate particulated expandable mass after it has been subject to pressed-in or otherwise-improvised blowing agent accumulation so as to be adequately imbibed therewith to afford same with the capability of being transformed into an expanded foam body structure.

The basic principles, relevant to expandable thermoplastic organic polymer compositions, including those in slightly-crosslinked form and particularly those based upon styrene and other related alkenyl aromatic monomers and polymers; crosslinking materials and agents therefor; blowing agents for expansion and cellular transformation of such materials into foam products, including hydrocarbon and fluorochlorocarbon and other materials therefor and their effective manner(s) of incorporation and usage; extrusion and shaping of thermoplastic materials and apparatus for same that is peculiar to and ordinarily utilized for the purpose, including the making and shaping of expanded foam cellular bodies; and the like—all of which is well known to those skilled in the art.

THE INVENTION

This invention concerns a novel "quick-quench" procedure and technique for the treatment of particulate thermoplastic organic polymer compositions following the stage under heat at an elevated temperature and pressure for imbibing of certain haloalkane including chlorofluorocarbon and/or hydrocarbon blowing agents and prior to the time that they are "blown" for foaming expansion in order to ensure uniform minimization of and in resultant plastic foam cell size and thereby avoid to the greatest possible extent the production of coarse cell structures in the foam product. Practice of the present invention is especially effective upon lightly-crosslinked expandable, foam-producing compositions, particularly those of homopolystyrene and the like or equivalent alkenyl aromatic polymers.

The present invention which finds and provides the way to noteworthy achievement of its above-indicated aims and goals merely involves: imbibing a chlorofluorocarbon or hydrocarbon or mixtures thereof as blowing agent into a particulate thermoplastic organic polymer mass under the influence of pressure for the purpose in a condition of being simultaneously subjected to heat at an elevated temperature; then immediately thereafter very quickly quenching the blowing agent-impregnated particles to temper them against excessive and undesirable coarse cell formation upon subsequent foaming by subjecting the freshly-imbibed particles before they have lost their heat of blowing agent impregnation to a very low temperature that is near or less than the freezing point of water, so as to very rapidly bring the particles being treated to a thermal condition drastically lower than that experienced during the step of blowing agent impregnation. The quench-tempered beads, after the quick cooling procedure subsequent to blowing agent-impregnation, may then be handled, transported, stored, and the like, in a normal manner until such time as it is desired to transform them into expanded cellular foam product of any suitable form or shape, including without mold-forming assistance, by any standard means for such purpose in order to obtain very uniform and fine celled product, including that of the light weight and exceptionally low bulk density variety of foamed plastics goods.

Any of a wide variety of thermoplastic organic polymer materials may be made into expandable particles or beads and treated for advantageous production of exceptionally uniform and very fine-celled foam products by the presently-utilized quick-quench treatment after blowing agent imbibement in accordance with the present invention. Most desirably, however, the thermoplastic material involved is a polymer (including copolymers and graft or block copolymer structures which may or may not be rubber modified versions of such products) of an alkenyl aromatic monomer of the structure:

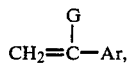

$$CH_2=\overset{G}{\underset{|}{C}}-Ar, \quad (I)$$

wherein G is selected from the group consisting of hydrogen and methyl and Ar is an aromatic radical (including various alkyl and halo-ring-substituted aromatic units) of from 6 to about 10 carbon atoms. Styrene is a preferred species of the Formula I monomers to have involved in the polymer thereof utilized in the thermoplastic material being handled. Nonetheless, the Formula I monomer(s) employed either individually for the preparation of the polymerizates utilized or in mixtures with one another (especially in beneficial admixture(s) with styrene) may satisfactorily include for polymer or copolymer preparation: any of the α-methylstyrene; vinyl toluene; vinyl naphthalene; the dimethyl styrenes; t-butyl styrene; and the like.

While homopolystyrene is a preferred thermoplastic polymer for use, satisfactory results are generally achievable when the thermoplastic polymer employed is one that contains at least about 60 percent by weight, based on total polymer weight of a Formula I monomer, especially styrene, therein polymerized; with any balance being another monomer (including any one or more of those of said Formula I) that is copolymerizable with styrene by free radical addition polymerizations procedures with styrene itself. The thermoplastic material involved may, be comprised without inclusion therein of any polymerized Formula I monomers from other ethylenically-unsaturated monomeric constituents that are polymerized solely or with other comonomers not falling within the Formula I basic structure provided that any such diverse monomeric precursors for other than alkenyl aromatic polymer products are in and of themselves copolymerizable with styrene by free radical addition polymerization operations. If other than polystyrene is utilized as the basic thermoplastic polymer involved, it is more advantageous for it to be one that contains co- or interpolymerized therein at least about 80 weight percent and even yet more desirable at least about 95 weight percent of a Formula I monomer (especially styrene).

Typical of other than Formula I monomers which may be employed for preparation of the thermoplastic polymer masses involved in practice of the present invention (and which are copolymerizable with styrene) are: unsaturated carboxylic acids and their esters, nitriles and amides, such as acrylic acid, methyl acrylate, ethyl acrylate, methyl methacrylate, acrylonitrile, α-methyl acrylonitrile, and so forth; the vinyl ketones, such as methyl vinyl ketone and methyl isopropenyl ketone; various of the vinyl organic acid esters, such as vinyl acetate, vinyl propionate, etc.; acrylic and methacrylic acid and esters thereof; maleic anhydride; and the like.

It is advantageous for the thermoplastic polymer material involved to be a lightly-crosslinked material. This tends to improve structural integrity characteristics of foam products therefrom manufactured, as well as enhancing the resistance to thermal collapse thereof during fabrication and other processing when subjected to heat at elevated temperatures than that to which a corresponding noncrosslinked polymer in the same system would expectably undergo such phenomenon when foamed (or being foamed) and given any high temperature exposure(s).

The advantageous lightly-crosslinked condition of the thermoplastic material, especially when polystyrene and/or other polymerizates of Formula I monomers are involved, is very desirably done with about 0.04 weight percent of such a cross-linking reagent as divinyl benzene. Of course, other cross-linkers can be employed for the same purpose of providing lightly-crosslinked thermoplastic polymer material for blowing agent impregnation and conversion thereupon to an expandable, cellular foam-producing intermediate. Thus, any of the cross-linkers (especially those that feature "vinyl-" and/or "allyl-" and/or "isopropenyl-" end group arrangements in their molecular structure and composition) disclosed and taught in U.S. Pat. No. 4,371,663. Application Ser. No. 389,836, filed June 18, 1982, now U.S. Pat. No. 4,454,086, may equivalently be employed instead of or in mixture with divinyl benzene to provide generally suitably, lightly-crosslinked thermoplastic organic polymer materials for the indicated application.

The blowing agents employed (which are either normally-gaseous or readily volatile substances) to be imbibed by the involved thermoplastics are preferably, as has likewise been mentioned and defined: at least monochlorinated or mono-fluorinated albeit incompletely-halogenated lower hydrocarbon halo-alkanes of $C_1$ to $C_3$ containment; $C_1$ to $C_3$ chlorofluorocarbons; and any of the $C_1$ to $C_5$ hydrocarbons; and mixtures thereof. Monochloro-methane ($CH_3Cl$), dichloro-difluoro-methane ($CF_2Cl_2$), trichloro-monofluoromethane ($CFCl_3$), trichloro-trifluoro-ethane $C_2F_3Cl_3$), propanes, butanes, pentanes and the like are illustrative of such well known materials. As indicated, it is oftentimes of great advantage, particularly when chlorofluorocarbons are being utilized, to employ mixtures of the involved blowing agents to more readily obtain therewith the desired capabilities of fugacity, solvency, and the like, in the propellant composition or formulated preparation used to achieve foamability of the thermoplastic material.

As a general rule, however, especially when beads of a lightly-crosslinked polystyrene or other Formula I monomer polymerizate (including grafted and block copolymer types with rubber modifying ingredients or not therein) are involved, the above-disclosed chlorinated or fluorinated alkane, chlorofluorocarbon and/or light hydrocarbon blowing agents and mixtures thereof are imbibed into the particulated thermoplastic material at an elevated temperature between about 65° to 80° C. and about 120° C. under applied blowing agent pressure(s) of between about 100 and 300 psig. As is well known, the temperature utilized for pressing of any given blowing agent formulation into the thermoplastic to be transformed into expandable intermediate(s) cannot exceed that which might cause thermal decomposition or degradation of the involved polymer and, at least to some significant degree, may satisfactorily be increased or decreased as a function of the applied pressure in the impregnating operation.

The amount of blowing agent pressed (or otherwise combined) into the thermoplastic materials to be so rendered as a foamable intermediate depends on the apparent density desired in the foam product intended to be made from the thermoplastic material. It is especially advantageous to apply practice of the present invention to blowing agent-containing thermoplastic intermediates in bead or other particulated form that are desired to be expanded into remarkably light weight foam products. The "quick-quench"-tempering of such intermediates immediately upon blowing agent addition serves to obtain resulting foam product (whenever thereafter the treated beads, etc. are "blown" into foamed shaped article structures) having excellent uniformity of cell size thereabout with very finely-dimensioned cell structures that at least largely if not entirely avoid coarse cell formation therein.

Practice of the present invention is especially advocatable and worthy of recommendation when it is desired to finally obtain small cell foam products whose great preponderance of individual cell sizes (say, in this connection, at least 90 to 95 percent numerically speaking) range from an average nominal diametric measure that is between about 0.02 and about 0.08 mm. Foams of the present invention generally have a density of from about 0.25 to 10 pounds per cubic foot. For production of low density foam, there is about 15 to 35 weight percent of the expandable particles and beneficially from about 20 to 30 weight percent as blowing agent. Literally 100 percent yields, or those nearly approaching that, may be anticipated in practice of the invention.

The crucial "quick-quench"-tempering operation pursuant to the present invention to ensure uniform minimization of the resultant plastic foam cell size in expanded cellular thermoplastic organic polymer products is generally best done by very rapidly and with slightest possible time delay thereabout cooling the blowing agent-imbibed particulate thermoplastic intermediate from the relatively elevated temperature at which the blowing agent incorporation has been accomplished to one that is vastly-reduced in comparison therewith to one that is close to or near the freezing point of water. In illustration of this, the imbibed thermoplastic intermediate should be quench tempered from the heat of blowing agent impregnation within not more than a minute, advantageously within not more than about 30 seconds, to a temperature effective throughout the blowing agent-containing mass being tempered that is less than about 10° C., and even more advantageously as to the temperature upon quenching that is below about 5° C. and even below the freezing point of water.

While various means may be relied upon for effective "quick-quench"-tempering in practice of the present invention, a most expedient way to accomplish same is to immerse the imbibed beads from at or about the elevated temperature of their pressurized blowing agent impregnation, without release of pressure in the temperature alteration step involved in the quench, in a bath of appropriately cold water (such as ice water, which even may contain dissolved salts, etc., in order to attain appropriate coldness and temperature stability during the operation) which is pre-set at the desired or appropriate low temperature condition in order to nicely and aptly accommodate the rapid chilling of the imbibed beads or the like being processed. The pressure is not released on the beads or other particles as obtained in their impregnation; drops rapidly and significantly in correspondence to the reduced temperature conditions involved in the quenching step. Pressurized equipment is utilized for both the blowing agent impregnation at elevated temperature and for and during the "quick-quench"-tempering step until the expandable bead intermediate thermoplastic product has attained sufficient cooling effect to remain stable for subsequent storage and handling until use in the preparation of expanded cellular plastic foam product and body. It is neither prudent nor expedient to depressurize the imbibed beads until they are thoroughly chilled by and in the quench tempering operation to avoid undesirable premature foaming and expansion thereof until such time as is actually wanted to convert them to expanded cellular end-product.

The "quick-quench"-tempering technique of the present invention may be accomplished in and with the sort of equipment schematically illustrated in the sole FIGURE of the accompanying drawing. In such, there is an imbibing reactor vessel generally identified by reference numeral 1 for holding the thermoplastic material beads to be impregnated with blowing agent at a suitable temperature to convert them to expandable bead intermediate. The reactor vessel 1 is provided with heating means (not shown) and has an internal mixing paddle or the like 2 therewith provided for bead stirring during the blowing agent impregnation. A pressure guage 5 indicates the pressurization applied during the blowing agent imbibation procedure or step. Blowing agent, including that provided in any desired mixture formulation, is admitted in pressurized supply through inlet port 3 leading into vessel 1 in the direction of arrow 4. After impregnation, the fully-imbibed thermoplastic beads or granules (without depressurization) are taken from vessel 1 through the outlet conduit 8, equipped with an opening or release valve 9, into the quench tank or unit designated generally by reference numeral 10.

Typically, the pressure of the reactor vessel is reduced between representative numerical values set forth and indicated as to spread therebetween by the directional arrow designated by reference numeral 6 and, in accompaniment with the pressure drop and devaluation, the temperature of the impregnated intermediate beads or other particulated shapes also undergoes a usual and representative diminishment as that which is numerically labelled about directional arrow 7 when valve 9 is opened in the discharge line 8 to evacuate the reactor vessel 1.

The impregnated beads or the like, which are not depicted in the Drawing, are then directly and as quickly-as-possible immersed into the very cold quenching media involved, such as most conveniently and of greatest efficacious practicality the ice water bath 11 shown in quench tank 10; this being done within the above-delineated rapid parameters of time and temperature for the vigorous quench treatment utilized. A pressure guage 12 is included on quench tank 10, as is additionally a temperature indicator 15.

As is brought forth in the Drawing, the rapid quench causes an immediate pressure drop of typical magnitude over the typical numerical range displayed by direction arrow 13 with corresponding increase in quench bath temperature of representative graduated gain being encountered, as demonstrated in the numerical increase given in association with directional arrow 15.

After completion of the tempering quench treatment, the expandable bead or otherwise particulated intermediate materials are taken to ambient conditions of normal atmospheric pressure and temperature for drying. During storage, transportation and handling of the particles prior to foaming, it is desirable to maintain the particles at a temperature below about −20° C.; or if desired, the particles may be molded into shaped articles after drying. The expansion tendencies of the foamable particulate intermediate bead or the like or equivalent product are arrested by the "quick-quench"-tempering technique of the present invention. Such cooled blowing agent-containing intermediates will foam to low density cellular structures by heating thereof above the glass transition temperature thereof to provide excellently uniform cellular products including those of very light weight final characteristics and properties.

While conventionally-sized expandable bead or granule intermediates are most commonly enhanced by subjection thereof to the tempering treatment of the present invention, other commendable and desirable products may also be so improved. These include expandable strands and other fiber-like tapes, pulverulant foams, sheet and film sorts of expandable intermediates and the like. All of such articles are thereby rendered better capable of being foamed to excellent closed-cell structures that exhibit good thermocollapse resistance when lightly-crosslinked thermoplastic materials are utilized. When light weight products are being produced, their fine and uniform cell characteristics are very desirably inherent in same.

The foamable intermediate beads and the like enhanced in the indicated ways by practice of the present invention may be made from thermoplastic organic polymer compositions that can, if desired or required, also be aptly provided with and contain other additaments that are oftentimes included in and for such goods such as, by way of non-limiting illustration: antioxidants; pigments; dyes; fillers; stabilizers; nucleating agents; mineral oil plasticizers; and the like.

WORKING EXEMPLIFICATION OF THE INVENTION

The following exemplary illustrations show the great benefit(s) that are obtainable in actual practice of the present invention.

FIRST ILLUSTRATION

Spherical particles were prepared in the known manner by suspension polymerization of a charge containing, as based on total weight thereof: 99.6 weight percent of monomeric styrene; 0.04 weight percent of divinyl benzene; 0.01 weight percent of ethyl-vinyl benzene; 0.2 weight percent of benzoyl peroxide; and 0.1 weight percent of t-butyl peroxide. Using 100 parts by weight of a water medium for the dispersion to be effected (which therein, based on total water weight, contained 0.25 weight percent of carboxymethyl methyl cellulose and 0.1 weight percent of sodium dichromate), the lightly-crosslinked interpolymerized droplets were included in the water in the amount of 100 parts by weight. The dispersed mixture was agitated to maintain the suspension therein involved during the entirety of a polymerization schedule which sequentially was maintained at 80° C. for 20 hours; 95° C. for a following 8 hours; and a final 4 hour period at 110° C.

For comparative purposes, the foregoing recipe was identically repeated excepting to eliminate the divinyl benzene from the charge. The general purpose type homopolystyrene thereby produced had: a number average molecular weight of 127,000 and a weight average molecular weight of 335,000. The general purpose polystyrene thermoplastic was noted to be soluble in toluene at room temperature. On the other hand, the first-prepared, lightly-crosslinked divinyl benzene/styrene interpolymerizate material only swelled to about 36 times its initial weight due to solvent take-up when immersed in toluene at room temperature for 24 hours.

The particles from both polymerizations were screened and that portion passing number 14 screen and retained on number 35 screen (U.S. Sieve Series) was used for foaming experiments.

Using an apparatus assembly analogous to that depicted in the drawing, 500 parts by weight of the lightly-crosslinked, divinyl benzene-interpolymerized polystyrene material were charged into a stirred, pressurizing reactor along with 2,400 parts by weight of water, 6 parts by weight of carboxymethyl methyl cellulose, 412 parts by weight of dichlorodifluoromethane and 100 parts by weight of trichlorofluoromethane wherein the charged mass was heated to 74.6° C. for about 24 hours.

Upon termination of the 24-hour period, the impregnating reactor vessels were voided in less than one minute to another enclosed and pressure tight quench vessel which contained a relatively large volume of water chilled to almost its freezing point with a copious quantity of broken ice therein included. During the transfer, the reactor pressure decreased from 256 psig to 85 psig and the reactor temperature decreased from 74.6° C. to 73.6° C. In the same interval, the quench pot pressure rose from atmospheric to near 100 psig. At the end of this time, the reactor was vented to atmospheric pressure and, after pressure equilibration thereof with the reactor, the quench pot was then also vented to zero gauge pressure.

The thereby imbibed polymer beads were recovered from the quench pot and water rinsed. They were then dried in air at room temperature and subsequently stored overnight under deep freezing conditions at a temperature near −23° C.

The expandable intermediate beads were thereafter foamed by heating within a hot air oven for three minutes at 140° C. A foamed product having very fine cells (less than 0.06 millimeter) and excellent appearance was obtained from the crosslinked particles. It was noted in the foamed product that there was some occurrence of larger cells (0.25 millimeter) in the interior of the expanded body.

SECOND ILLUSTRATION

The general procedure of the First Illustration was duplicated to prepare divinyl benzene-interpolymerized, lightly-crosslinked polystyrene beads of an average diameter on the order of 0.9 mm.

The imbibing procedure set forth in the First Illustration was then again duplicated with the 0.9 mm beads excepting to use in the impregnating formulation (with all other component charges being the same) 413 parts by weight of the dichlorodifluoromethane instead of the only 412 parts by weight thereof previously employed.

About the same temperature drop in the reactor was noted upon its venting after the imbibing had been completed as occurred in the First Illustration. However, the noted pressure decrease upon reactor release was from 220 psig to 60 psig. Quench tank temperature during the rapid tempering increased from 0° C. to 3.3° C.; after which it rose to an ultimate 6.7° C. when atmospheric pressure was therein reached.

When the intermediate product expandable beads were foamed, a very good quality, small celled foam structure was produced. The cell size in the center of the particles was about 0.11 millimeter and at the surface less than 0.06 millimeters.

THIRD ILLUSTRATION

The procedure of the Second Illustration was repeated excepting, in the imbibing step, to change the contents of the blowing agent-impregnating formulation to 101 parts by weight of the trichloromonofluoromethane and 410 parts by weight of the dichlorodifluoromethane constituents and to do the imbibing at 81.5° C. over the 24-hour period. The cell size was less than 0.06 millimeters.

After overnight storage in a deep freeze, a very fine and uniform foam product was obtained upon expanding of the imbibed intermediate beads. This final cellular product was characterized in having an exceptionally fine and relatively constant cell structure throughout.

Analogous good results are obtained when the above-illustrated and other techniques are utilized with other thermoplastic materials and other blowing agent systems to prepare intermediate expandable bead or the like products treated in accordance with the "quick-quench"-tempering treatment of the present invention.

Many changes and modifications are possible to readily make and adapt in practice of the present invention without substantial or material departure from its essential spirit and scope.

What is claimed is:

1. In the making of expandable bead and the like or equivalent physical forms of intermediate, blowing agent-containing masses of thermoplastic organic polymer material suitable for conversion to fine celled plastic foam product upon subjection of such expandable thermoplastic material to heat at a temperature at least equal to the glass transition temperature of the polymerizate therein but below its decomposition temperature, wherein
   (i) the involved blowing agent is a volatile normally-gaseous or readily-vaporizable substance selected from the group consisting of: at least mono-chlorinated or mono-fluorinated but incompletely-halogenated lower hydrocarbon halo-alkanes of $C_1$ to $C_3$ content; $C_1$ to $C_3$ chlorofluorocarbons; $C_1$ to $C_5$ aliphatic hydrocarbons; and mixtures thereof, with
   (ii) the expandable particle containing from about 5 to about 35 weight percent blowing agent impregnated in said thermoplastic organic polymer material;
the step of improvement consisting essentially of:
   (iii) a quick-quench tempering treatment for the imbibed physical form of said thermoplastic material containing said impregnated blowing agent which involves rapidly cooling said bead or the like form in a quench media after completion of blowing agent imbibation at a temperature as indicated of at least about 65° C. to a rapidly-diminished chill temperature of said beads as a result of the said quench of less than about 10° C., wihtin not more than a minute whereupon and whereby
the said expandable beads or the like are adapted to be converted upon expansion into foam body product characterized in having a density of from about 0.25 to about 10 pounds per cubic foot and having cells of about 0.02 to about 0.08 millimeter.

2. The process of claim 1 when said rapidly-diminished chill temperature attained in said beads as a result of said tempering treatment (iv) does not exceed about 5° C. and is accomplished within not more than about 30 seconds.

3. The process of claim 1 wherein said thermoplastic organic polymer material is a lightly crosslinked copolymer which is crosslinked to the equivalent of 0.04 weight percent divinylbenzene.

4. The process of claim 3 wherein said thermoplastic organic polymer material is a lightly-crosslinked copolymer of a styrene monomer.

5. The process of claim 3 wherein said thermoplastic organic polymer material is a lightly-crosslinked polystyrene material.

6. The process of claim 3 wherein said thermoplastic organic polymer material is a lightly-crosslinked polystyrene material and said involved blowing agent to be imbibed by said polystyrene material is a mixture of chlorofluorocarbons.

7. The process of claim 1, with said blowing agent is a mixture of chlorofluorocarbons being a combination of trichloro-monofluoro-methane and dichlorodifluoroethane.

8. The process of claim 1 wherein said quench media of Step (iii) is aqueous in nature.

9. The process of claim 8, with ice water being the said aqueous quench media of Step (iii).

* * * * *